United States Patent
Peretz et al.

(10) Patent No.: US 12,175,710 B2
(45) Date of Patent: Dec. 24, 2024

(54) DEVICE, A METHOD AND AN APPARATUS FOR IMPROVING QUANTIZATION CAPABILITIES FOR COMPUTER VISUAL APPLICATIONS

(71) Applicant: INUITIVE LTD., Ra'anana (IL)

(72) Inventors: Dor Peretz, Kfar Saba (IL); Edward Elikhis, Ra'anana (IL)

(73) Assignee: INUITIVE LTD., Ra'Anana (IL)

( * ) Notice: Subject to any disclaimer, the term of this patent is extended or adjusted under 35 U.S.C. 154(b) by 377 days.

(21) Appl. No.: 17/835,399

(22) Filed: Jun. 8, 2022

(65) Prior Publication Data
US 2023/0401746 A1    Dec. 14, 2023

(51) Int. Cl.
*G06T 7/80* (2017.01)
*G06T 5/92* (2024.01)

(52) U.S. Cl.
CPC ............. *G06T 7/80* (2017.01); *G06T 5/92* (2024.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2020/0065676 A1* | 2/2020 | Lo | ............... | G06N 20/00 |
| 2021/0303156 A1* | 9/2021 | Kachare | ............... | G06F 3/0673 |
| 2022/0067530 A1* | 3/2022 | Khailany | ............... | G06F 7/5443 |
| 2022/0129759 A1* | 4/2022 | Yao | ............... | G06N 3/084 |
| 2022/0261991 A1* | 8/2022 | Hsiao | ............... | G06T 7/20 |
| 2022/0358627 A1* | 11/2022 | Deng | ............... | G06T 5/92 |
| 2022/0392117 A1* | 12/2022 | Akutsu | ............... | G06T 9/002 |

OTHER PUBLICATIONS

Towards Low-bit Quantization of Deep Neural Networks with Limited Data. Yuan et al. (Year: 2021).*
Quantization Algorithm in Neural Network Training. Liu et al. (Year: 2022).*

* cited by examiner

*Primary Examiner* — Delomia L Gilliard
(74) *Attorney, Agent, or Firm* — FISHERBROYLES, LLP; Roger L. Browdy; Ronni S. Jillions

(57) ABSTRACT

A method and a computational module are provided for carrying out a quantization process of a plurality of channels carrying data received from an image capturing sensor. The computational module comprises: at least one array of processors, configured to a) retrieve data from: a1) a neural network graph, a2) a dataset associated with a data and a3) parameters' values of a neural network model; b) carry out a dynamic range calibration process for the channels received and using the neural network graph for deriving grouping constrains associated with respective channels; c) carry out a grouping optimization based on results obtained for each channel from its respective dynamic range calibration and its grouping constrains; d) arrange the channels so that channels having similar grouping constrains are grouped together into one output channel; and e) calculate required quantization parameters for carrying out a quantization process of the output channels.

14 Claims, 6 Drawing Sheets

FIG. 1 - PRIOR ART

DEVICE, A METHOD AND AN APPARATUS FOR IMPROVING QUANTIZATION CAPABILITIES FOR COMPUTER VISUAL APPLICATIONS

TECHNICAL FIELD

The present disclosure generally relates to devices, methods and apparatus for use in optical devices, and more particularly, for improving processing capabilities for computer visual applications.

BACKGROUND

Quantization is the process of mapping continuous infinite values to a smaller set of discrete finite values. Typical examples of quantization processes are rounding and truncation. The difference between an input value and its quantized value (such as round-off error) is referred to as quantization error. A device or an algorithmic function that performs quantization is called a quantizer.

Neural network quantization is a process of reducing the precision of the weights and tensors in the neural network, thus reducing the memory, computation, and energy bandwidths. A quantization process must refer to the following limitations and restrictions:
1. Results accuracy—results of the neural network scheme after applying quantization procedure must be close to the results calculated by applying floating point arithmetic.
2. The quantization scheme must take into consideration flow limitation implemented in the neural network execution engine. It is mostly important for the HW based engine, but it is true for the SW engine as well.
3. The quantization scheme must enable its implementation for different neural network architectures and be flexible enough to support tradeoff between results accuracy and required resources (memory, calculation power etc., . . . ).
4. A specific algorithm is required to calculate quantization scheme parameters based on the neural network architecture and statistics that represents a specific use case.

The formula for an output tensor element (to be referred to hereinafter as an output pixel) in a convolution with C input channels, $C_{out}$ output channels, and kernel size of k, is:

$$\text{Out}(j, x, y) = \text{Bias}(j) + \sum_{i=0}^{c-1}\sum_{v=0}^{k-1}\sum_{w=0}^{k-1} \text{weight}(j, i, v, w) * (i, x+v, y+w)$$

where 'j' is the output channel number (with values 0 to $C_{out}-1$);
'x' is the horizontal pixel location; and
'y' is the vertical pixel location.

$$\frac{c}{G}$$

The input channels are divided into s groups with G channels per group. One can therefore write:

$$\text{Out}(j, x, y) =$$

-continued
$$\text{Bias}(j) + \sum_{g=0}^{\frac{c}{G}-1} N(g) \sum_{i=0}^{G-1}\sum_{v=0}^{k-1}\sum_{w=0}^{k-1} \frac{\text{weight}(g, j, i, v, w) * (i, x+v, y+w)}{N(g)}$$

where N(g) is a group coefficient that helps to normalize the inputs (and/or weights) per group and relax the dynamic range requirements for the entire inputs/weights population.

A computing engine that can be applied to multiply a partial convolution result with a "group" coefficient as explained above, can help to relax the dynamic requirements for inputs and weights.

The present invention seeks to provide a computational module that enable improving the computation precision of data undergoing quantization.

SUMMARY OF THE DISCLOSURE

The disclosure may be summarized by referring to the appended claims.

It is an object of the present disclosure to provide a method and apparatus that implement an innovative quantization method that is based on grouping channels having similar dynamic range and associated constrains It is another object of the present disclosure to provide a method and apparatus that implement an improved quantization process that is faster than other quantization processes used in the art and its results are more accurate than the other quantization processes used.

Other objects of the present invention will become apparent from the following description.

According to a first embodiment of the disclosure, there is provided a computational platform for use in a quantization process of a plurality of channels carrying data received from an image capturing sensor, wherein the computational platform comprises:
at least one array of processors, configured to
retrieve data from:
a neural network graph,
a dataset associated with a data channel received from said image capturing sensor, and
parameters' values of a neural network model;
carry out a dynamic range calibration process for the channels received and using the neural network graph for deriving therefrom grouping constrains associated with respective channels;
carry out a grouping optimization based on results obtained for each given channel from its respective dynamic range calibration process and its grouping constrains;
arrange the channels carrying the data so that channels having similar grouping constrains are grouped together into one output channel; and
calculate required quantization parameters for carrying out a quantization process.

The term "computational platform" as used herein throughout the specification and claims, is used to denote a number of distinct but interrelated units for carrying out a computational process. Such a computational platform can be a computer, or a computational module such as an Application-Specific Integrated Circuit ("ASIC"), or a Field Programmable Gate Array ("FPGA"), or any other applicable processing device. Moreover, the quantization scheme configuration may be affected by one computational platform, such as a computer and the like, whereas another computational platform such as an ASIC is used to execute that quantization scheme configuration. It should be understood that such variations are also encompassed by the scope of the present invention.

The term "image sensor" as used herein throughout the specification and claims, is used to denote a sensor that detects and conveys information used to make an image. Typically, it does so by converting the variable attenuation of light waves (as they pass through or reflect off objects) into signals. The waves can be light or another electromagnetic radiation. An image sensor may be used in robotic devices, AR/VR glasses, a drone, a digital camera, smart phones, medical imaging equipment, night vision equipment and the like.

Furthermore, it should be understood that the term "data received from an image capturing sensor" or any modification thereof which appears in the present specification and claims relates to both, data received directly from an image capturing sensor, or data received indirectly from an image capturing sensor, for example, data received from an image capturing sensor and stored in a memory, and while carrying out the present invention, that stored data is retrieved from the memory. Thus, it should be understood that both these options are encompassed by the present invention.

According to another embodiment of the present disclosure, the computational platform comprises at least one macro array of processing elements, wherein each of the at least one macro array comprises a plurality of basic arrays of processing elements and wherein each of the plurality of basic arrays comprises a plurality of processing elements, and the at least one macro array, the plurality of basic arrays and the plurality of processing elements are arranged in a layered hierarchical order.

By yet another embodiment, the grouping constrains are at least two of the constrains' group that consists of:
  i) input feature map distribution per an input channel;
  ii) output feature map distribution per an output channel, whereas this output feature map distribution is preferably used as the input feature map for the next layer; and
  iii) weights distribution per input per output channel, wherein each input channel is associated with a vector of output channel distribution.

In accordance with another embodiment, the at least one array of processors is configured to group the plurality of channels, by implementing one of the following options:
  i) implementing a single grouping approach by which all channels included in a certain group at one layer, will remain at the same group while grouping the input channels of a next layer into a next layer output channel; or
  ii) adding a re-grouped layer to at least some of the output channels that are forwarded to an upper later to be used as input channels thereat; or
  iii) dividing a chain of groups being forwarded to a next layer into several sub-chains and adding a re-grouped layer between any two subsequent sub-chains.

According to still another embodiment, the computational platform is further configured to select one or more of the plurality of groups, where each of the plurality of groups comprises data carrying channels, having similar grouping constrains as other data carrying channels included at the same group, and wherein the one or more selected groups are selected while implementing a criterion by which quantizing each such a selected group with higher precision (e.g., 16 bit for a 8 bit channels) would increase the overall accuracy of the respective selected group, more than the accuracy of the non-selected groups.

According to another aspect of the present disclosure, there is provided a method for use in a quantization process of a plurality of channels carrying data received from an image capturing sensor, wherein the method comprises the steps of:
  retrieving data from:
    a neural network graph,
    a dataset associated with a data channel received from said image capturing sensor, and
    parameters' values of a neural network model;
  carrying out a dynamic range calibration process for the channels received and using the neural network graph for deriving therefrom grouping constrains associated with respective channels;
  carrying out a grouping optimization based on results obtained for each given channel from its respective dynamic range calibration process and its grouping constrains;
  arranging the channels carrying the data so that channels having similar grouping constrains are grouped together; and
  calculating required quantization parameters for carrying out a quantization process of channels carrying data received form the image capturing sensor.

In accordance with another embodiment, the number of channels in a group may be configured. For example, up to 16 channels According to another embodiment, the method further comprises combining the plurality of the up to 16 channels groups' output channels, into a number of next layer output channels.

According to another embodiment, the step of combining the plurality of the up to 16 output channels, into a number of next layer output channels, comprises re-grouping of a next layer group by including at least two channels that belonged to at least two respective different groups at the preceding layer, into that next layer group.

In accordance with another embodiment the grouping constrains are at least two of the constrains' group that consists of:
  i) input feature map distribution per an input channel;
  ii) output feature map distribution per an output channel; and
  iii) weights distribution per input per output channel, wherein each input channel is associated with a vector of output channel distribution.

According to still another embodiment, the method provided is characterized in that grouping of the plurality of channels is carried out by implementing a single grouping approach by which all channels included within a certain group at one layer, will remain at the same group while grouping the input channels of a next layer into a next layer output channel.

By yet another embodiment, the method provided is characterized in that grouping of the plurality of channels is carried out by implementing a re-grouped layer added to at least some of the output channels that are forwarded to an upper later to be used as input channels thereat.

In accordance with another embodiment, the method provided is characterized in that grouping of the plurality of channels is carried out by dividing a chain of groups being forwarded to a next layer into several sub-chains and adding a re-grouped layer between any two subsequent sub-chains.

According to another embodiment, the method further comprises a step of selecting one or more of the plurality of groups, wherein each of the plurality of groups comprises data carrying channels, having similar grouping constrains as other data carrying channels included at the same group, and wherein the one or more selected groups are selected while implementing a criterion by which quantizing each selected group with a higher precision would increase the overall accuracy of the respective selected group, over an accuracy of non-selected groups.

According to another aspect of the present disclosure, there is provided an image capturing sensor comprising a computational platform as described hereinabove.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

As discussed above, one of the major objects of the present invention is to provide novel method and apparatus that implement innovative method to improve precision of the obtained results, by implementing a quantization procedure.

Figure 1:
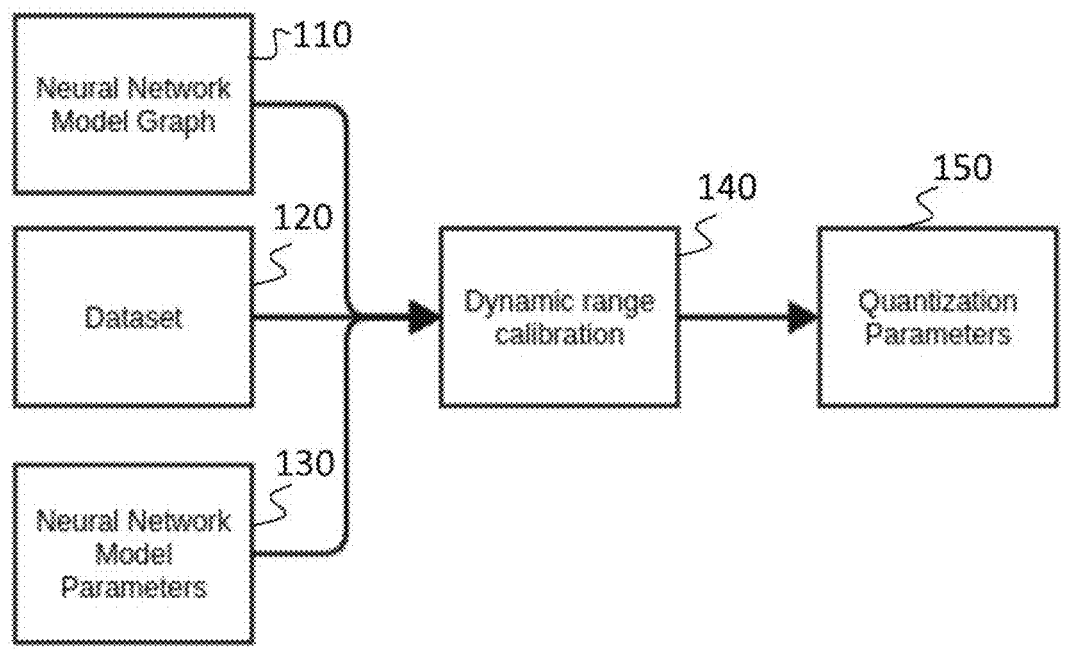
FIG. 1 illustrates an example of a prior art method for carrying out a quantization process.

The prior art method is illustrated in FIG. 1. As can be seen from this FIG., first, data retrieved from neural network graph 110, from dataset 120 which comprises data associated with the specific implementation for which the quantization process is about to be carried out. channel and parameters 130 from the neural network model 130 are applied to carry out dynamic range calibration 140 for that arbitrary 8 bit channel, and the outcome of dynamic range calibration 140 is used to obtain quantization parameters 150. The quantization parameters are then used when applying the quantization procedure for dataset 120.

In other words, the prior art methods may be characterized as methods that implement the following:
1) They take into account only the input and output feature maps while disregarding all other considerations.
2) The input and output feature maps are sorted by the min max values.
3) The weights are re-ordered by the input and output Density Item Managers ("DIMs").

As opposed to that, the present invention seeks to provide more accurate results for the quantization procedure. One of the underlying ideas of the method provided by the present invention is that the constrains associated with the different channels, should be taken into consideration in order to group similar channels together.

Figure 2:
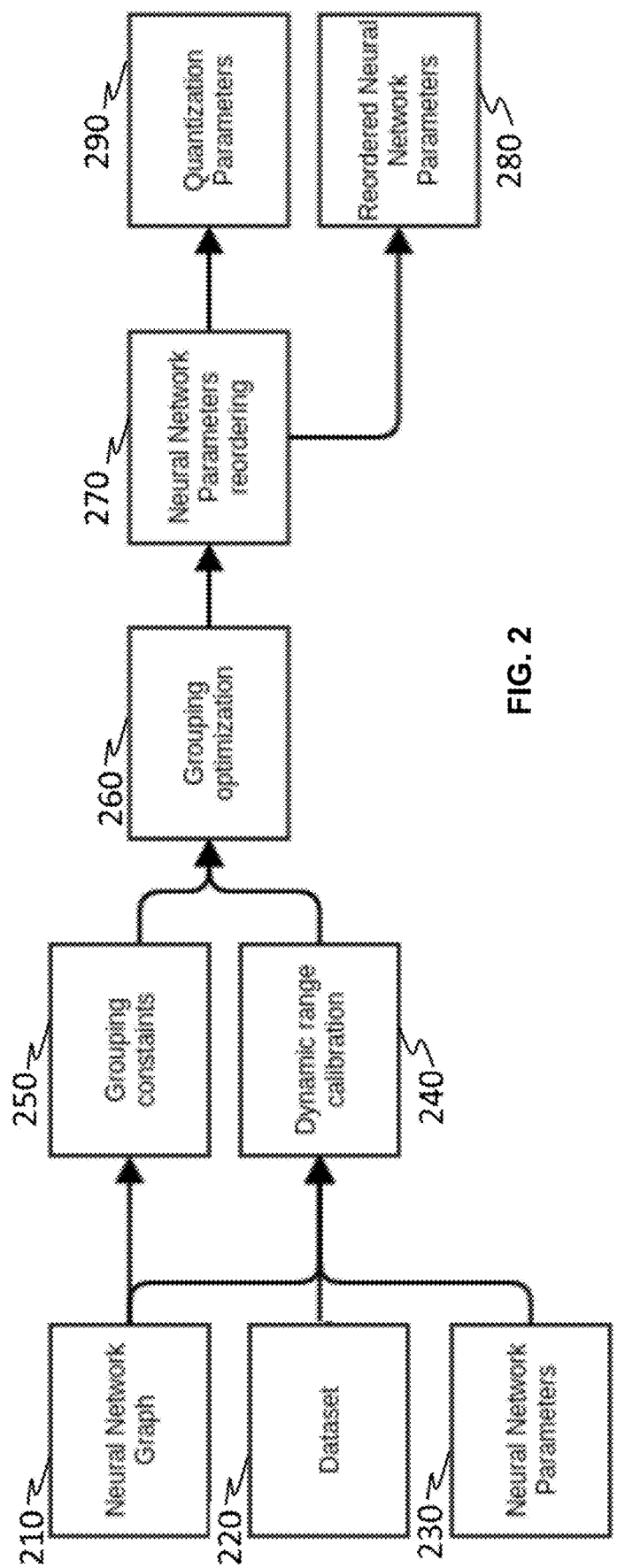
FIG. 2 illustrates an example of a method for carrying out a grouping quantization in accordance with an embodiment construed in accordance with the present invention.

FIG. 2 illustrates such a process that is construed in accordance with an embodiment of the present disclosure.

According to the embodiment illustrated in FIG. 2, data retrieved from neural network graph 210, from dataset 220 associated with an n bit channel (e.g., where n=8 in the present example) and parameters 230 from the neural network model 230 are applied to carry out a dynamic range calibration process 240 for each 8 bit channel. However, unlike prior art methods as illustrated in FIG. 1, according to this embodiment of the present invention, neural network graph 210 is further used for deriving grouping constrains (parameters) 250, that is used in the determination of the channel's dynamic range 240.

Once the outcomes of the dynamic range calibration process 240 and the grouping constrains 250 are obtained, they are used to acquire grouping optimization 260 which is followed by re-ordering of the neural network parameters 270, in which the channels having similar grouping constrains are grouped together, say into a 16 channels group.

Figure 3:
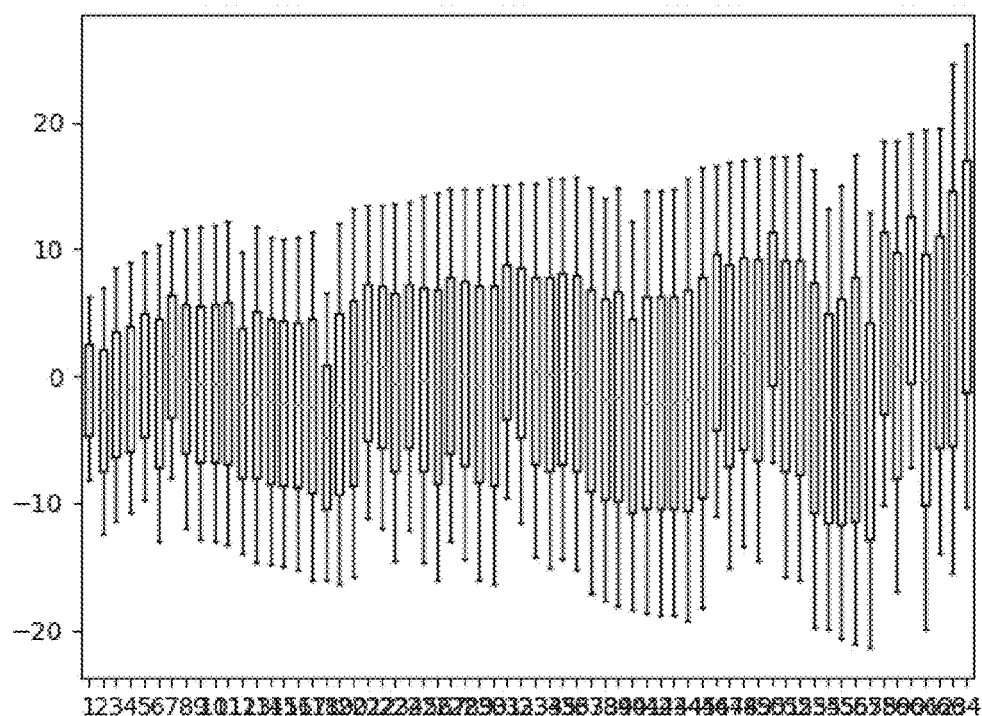
FIG. 3. Exemplifies an input features' map distribution, per an input channel.
Figure 4:
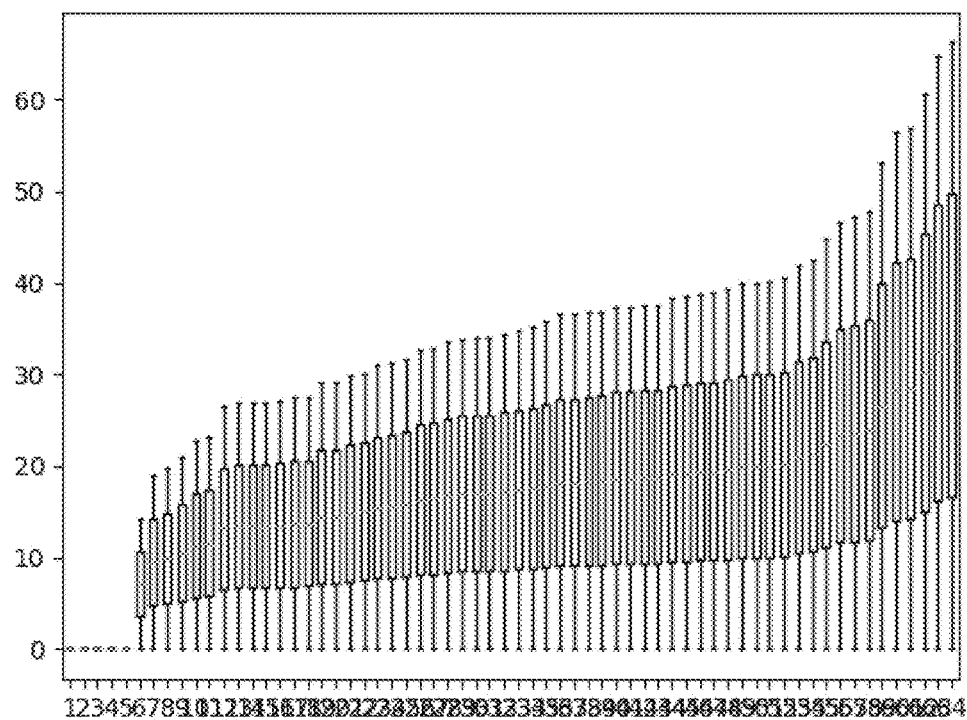
FIG. 4 Exemplifies an output features' map distribution, per an output channel.

Optional grouping constrains (i.e., parameters), may be any applicable combination from among the following constrains (preferably all):
  Input feature map distribution per an input channel (see an example in FIG. 3);
  Output feature map distribution per an output channel (see an example in FIG. 4), whereas this output feature map distribution may preferably be used as the input feature map for the next layer;
  Weights distribution per input per output channel, wherein for each input channel there will be a vector of output channel distribution.

The results of the re-ordering of the neural network parameters 270 are then stored 280 and are also used to achieve required quantization parameters 290 for carrying out the current quantization iteration.

Once the required accuracy has been achieved, the optimized grouping of the channels may be applied in a design of a chipset, so that when the chipset is operating the channels with the similar dynamic range will be next to each other.

Figure 5:
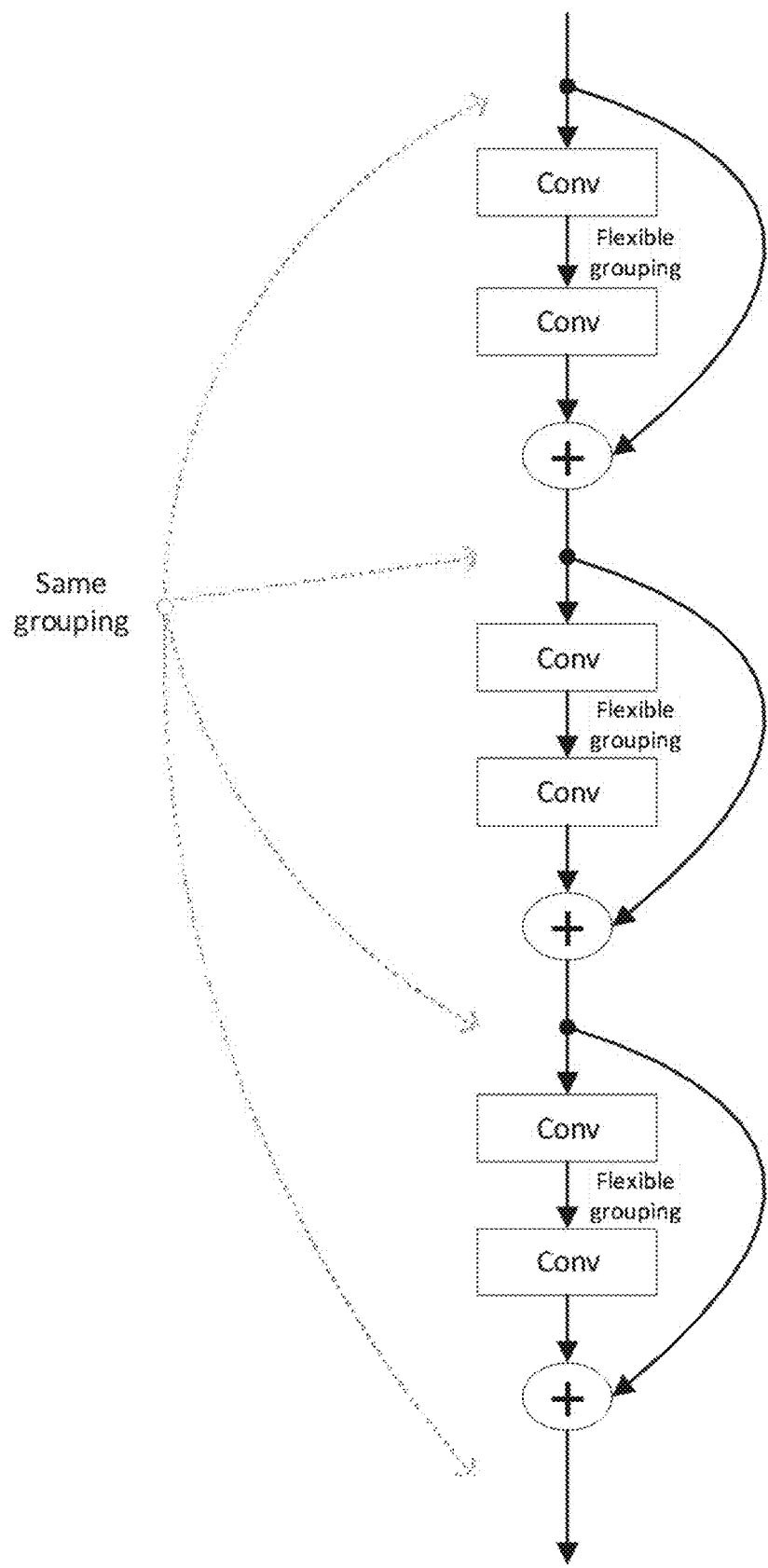
FIG. 5 demonstrates an optional grouping approach construed in accordance with an embodiment of the present invention.
Figure 6:
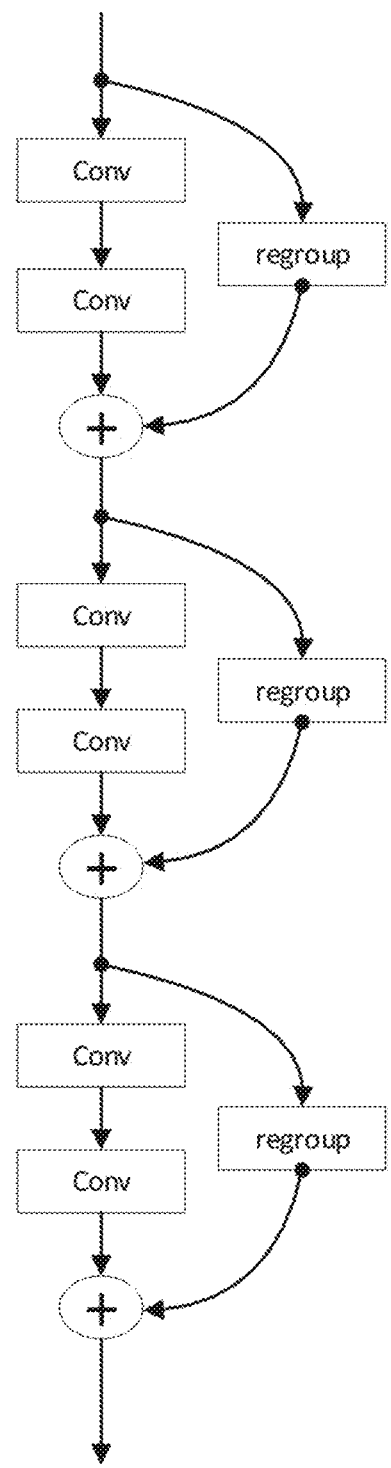
FIG. 6 demonstrates another optional grouping approach construed in accordance with another embodiment of the present invention.

Moreover, according to another embodiment of the present invention there are a few approaches for carrying out the grouping part of the invention as demonstrated in FIG. 5 and FIG. 6.

FIG. 5 illustrates one approach for grouping, by which the same grouping of the channels remains fixed in all junctions when moving from one layer to a higher one.

A different approach is demonstrated in FIG. 6, where a re-grouped layer is added at each bypass node. This option provides a full flexibility (i.e., a different grouping at each node) but the drawback of this option is that re-grouping requires a higher computational power when implementing the architecture discussed hereinabove (like a convolution).

A third approach for carrying out the grouping process is to divide such a chain of steps as illustrated in FIG. 5 and in FIG. 6 into several sub-chains and add a re-grouped layer between any two subsequent sub-chains. This approach requires fewer regrouping blocks, and thus saves processing power.

The following example demonstrates a possible scenario of a grouping process.

Starting with Conv_504 in which:
W (128×128×3×3)
B (128)
dilations=2,2
group=1
kernel_shape=3,3
pads=2, 2,2, 2
Following rule 505, one gets:
Conv_506 in which:
W (128×128×3×3)
B (128)
dilations=4,4
group=1
kernel_shape=3,3
strides=1,1.
Next, by following rule 507, one gets:
Conv_508 in which:
W (96×128×3×3)
B (96)
dilations=8, 8
group=1
kernel_shape=3,3
pads 8,8,8,8
strides=1,1.
By following rule 509, one gets:
Conv_510 in which:
W (64×96×3×3)
B (64)
dilations=16,16
group=1
kernel_shape=3,3
pads 16, 16, 16, 16
strides=1,1.
Then, the outcome of applying rule 511 is:
Conv_512 in which:
W (32×64×3×3)
B (32)
dilations=1,1
group=1
kernel_shape=3,3
pads 1,1,1,1
strides=1, 1.

Now, let us consider the following example for the process of quantization grouping.

First, let x be a tensor sized (B,Ci,H,W) and w be a tensor sized (Co,Ci,Hw,Ww).

We want to calculate y=conv(x,w) so y is of the size (B, Co, H, W).

$$xr=(x\_max-x\_min)$$

$$xq=(x-x\_min)/xr$$

$$x=xq*xr+x\_min$$

$$yq=(\text{conv}(xq*xr+x\_min,wq*wr+w\_min)-y\_min)/y\_r$$

$$yq=(\text{conv}(xq*xr,w*wr)+\text{conv}(x\_min,wq*wr)+\text{conv}(xq*xr,w\_min)+\text{conv}(x\_min,w\_min)-y\_min)/yr$$

$$yq=(c0+c1)+(c2+c3-y\_min)/yr$$

$$\text{offline}=(c2+c3-y\_min)/yr$$

online:

$$c0=\text{conv}(x*xr,w*wr)/yr$$

$$c1=\text{conv}(x*xr,w\_min)/yr$$

if x is quantized per layer and w quantized per output channel we get:
xr is a scalar, wr yr w_min are of shape (1,Co,1,1)

$$c0=\text{conv}(xq,wq)*((xr*wr)/yr)$$

$$c1=\text{conv}(xq,\text{ones\_like}(w))*((xr*w\_min)/yr)$$

The latter is not needed in case of a symmetric quantization.

In the above, the right multiplier can be also calculated offline, whereas the left multiplier needs to be calculated online.

For the convolution operation 2 inputs are provided within a range of 0 . . . 1 which can be summed without being multiplied by the input channel scale first.

However, this cannot be done if w was quantized per output per input channel or x was quantized per input channel.

Yet, because the solution of the present invention enables to sum and multiply each group of up to 16 input channels separately before their final accumulation, it is possible to quantize x per the input channels and w per the input channels per output channel.

It should be noted that grouping should preferably be done while taking into consideration both, w output channel distributions and x input channel distributions.

Furthermore, the fact we can multiply x by vector v of shape (1,Ci,1,1) and divide w by the same v, results in that same results adds another diminution that could be optimized.

Figure 7:
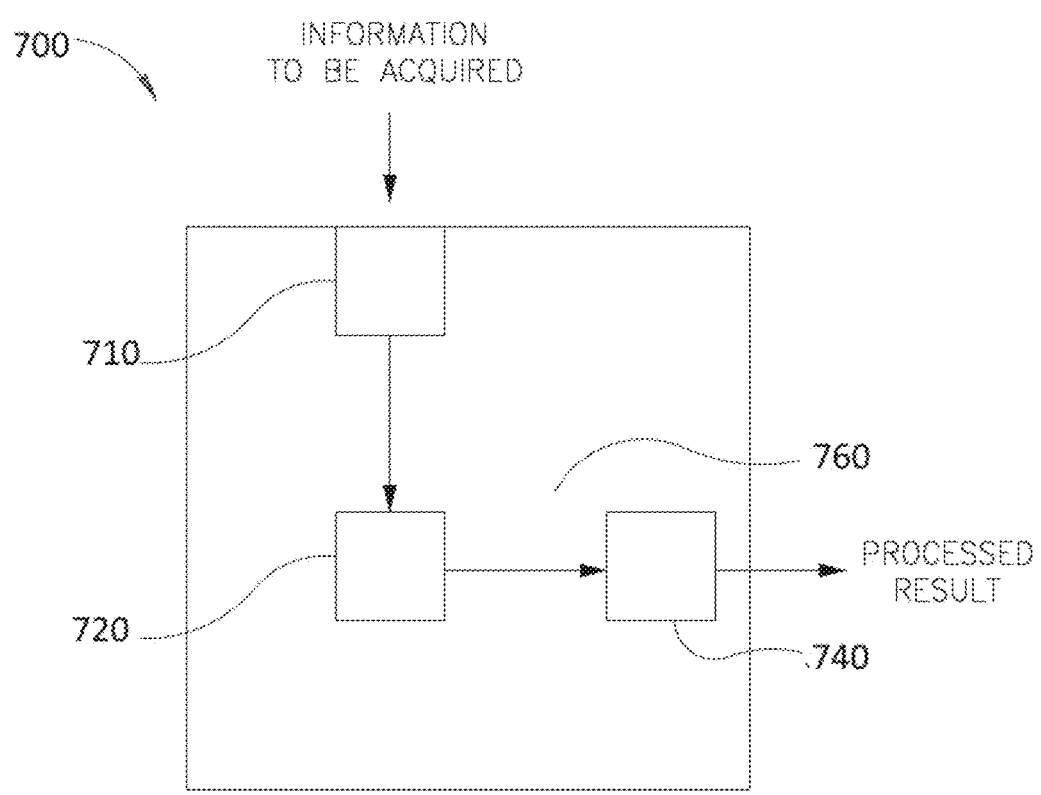
FIG. 7 exemplifies in a schematic way, a user device for carrying out a computer vision application and construed in accordance with an embodiment of the present invention.

FIG. 7 demonstrates in a schematic way, a user device 300 for carrying out a computer vision application and construed in accordance with an embodiment of the present invention.

In accordance with this embodiment, the user device 700 which may be for example a robotic means, AR/VR glasses, a drone or any other applicable user device, and is adapted for carrying out a computer vision application, comprises an image sensor 710 where the latter is configured to acquire and convey information for generating an image. The information is forwarded to memory 720 where it is stored and then the information is retrieved from memory 720 and processer by a processor 740 which is configured to receive the conveyed information 760 from memory 720 and to apply a grouping quantization method of the data received as described above. Thus, the outcome of processing, analyzing and understanding the digital images acquired by processor 740 enable extraction of high-dimensional data from the real world and to generate numerical or symbolic information therefrom, e.g., generation of decisions.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A computational platform for use in a quantization process of a plurality of channels carrying data received form an image capturing sensor, wherein said computational platform comprises:
   at least one array of processors, configured to
      retrieve data from:
         a neural network graph,
         a dataset associated with a data channel received from said image capturing sensor, and
         parameters' values of a neural network model;
      carry out a dynamic range calibration process for the channels received and using said neural network graph for deriving therefrom grouping constrains associated with respective channels;
      carry out a grouping optimization based on results obtained for each given channel from its respective dynamic range calibration process and its grouping constrains;
      arrange the channels carrying the data so that channels having similar grouping constrains are grouped together into one output channel; and
      calculate required quantization parameters for carrying out a quantization process of output channels carrying data received form the image capturing sensor.

2. The computational platform of claim 1, comprising at least one macro array of processing elements, wherein each of said at least one macro array comprises a plurality of basic arrays of processing elements and wherein each of said plurality of basic arrays comprises a plurality of processing elements, and said at least one macro array, said plurality of basic arrays and said plurality of processing elements are arranged in a layered hierarchical order.

3. The computational platform of claim 1, wherein each of the plurality of channels is an 8 bit channel, and wherein the at least one array of processors is configured to group the plurality of said 8 bit channels into output channels.

4. The computational platform of claim 1, wherein said grouping constrains are at least two of the constrains' group that consists of:
   i) input feature map distribution per an input channel;
   ii) output feature map distribution per an output channel; and
   iii) weights distribution per input per output channel, wherein each input channel is associated with a vector of output channel distribution.

5. The computational platform of claim 1, wherein said at least one array of processors is configured to group the plurality of channels, by implementing one of the following options:
   i) implementing a single grouping approach by which all channels included in a certain group at one layer, will remain at the same group while grouping the input channels of a next layer into a next layer output channel; or
   ii) adding a re-grouped layer to at least some of the output channels that are forwarded to an upper to be used as input channels thereat; or
   iii) dividing a chain of groups being forwarded to a next layer into several sub-chains and adding a re-grouped layer between any two subsequent sub-chains.

6. An image capturing sensor comprising a computational platform of claim 1.

7. A method for use in a quantization process of a plurality of channels carrying data received from an image capturing sensor, wherein said method comprises the steps of:
   retrieving data from:
      a neural network graph,
      a dataset associated with a data channel received from said image capturing sensor, and
      parameters' values of a neural network model;
   carrying out a dynamic range calibration process for the channels received and using said neural network graph for deriving therefrom grouping constrains associated with respective channels;
   carrying out a grouping optimization based on results obtained for each given channel from its respective dynamic range calibration process and its grouping constrains;
   arranging the channels carrying the data so that channels having similar grouping constrains are grouped together; and
   calculating required quantization parameters for carrying out a quantization process of channels carrying data received form the image capturing sensor.

8. The method of claim 7, wherein each of the plurality of channels is an 8 bit channel, and wherein the method comprising grouping the plurality of said 8 bit channels into output channels each comprising a 16 channels group.

9. The method of claim 8, further comprising combining the plurality of the 16 channels groups' output channels, into a number of next layer output channels, each comprising two 16 channels output channels' groups, and wherein said combination is carried out at a higher layer than the one at which the 8 bit channels were grouped into output channels having each a 16 channels' group.

10. The method of claim 7, wherein said grouping constrains are at least two of the constrains' group that consists of:
    i) input feature map distribution per an input channel;
    ii) output feature map distribution per an output channel; and
    iii) weights distribution per input per output channel, wherein each input channel is associated with a vector of output channel distribution.

11. The method of claim 8, characterized in that grouping of the plurality of channels is carried out by implementing one of the following options:
    i) implementing a single grouping approach by which all channels included in a certain group at one layer, will remain at the same group while grouping the input channels of a next layer into a next layer output channel; or
    ii) adding a re-grouped layer to at least some of the output channels that are forwarded to an upper later to be used as input channels thereat; or
    iii) dividing a chain of groups being forwarded to a next layer into several sub-chains and adding a re-grouped layer between any two subsequent sub-chains.

12. The method of claim 7, further comprising a step of selecting one or more of said plurality of groups, wherein each of said plurality of groups comprises data carrying channels, having similar grouping constrains as other data carrying channels included at the same group, and wherein the one or more selected groups are selected in accordance with a criterion by which quantizing each selected group with a higher precision would increase the overall accuracy of the respective selected group, over an accuracy of non-selected groups.

13. The method of claim 7, further comprising a step of combining a plurality of up to 16 output channels, into a number of next layer output channels.

14. The method of claim 13, wherein the step of combining the plurality of the up to 16 output channels, into a number of next layer output channels, comprises re-grouping of a next layer group of channels by including at least two channels that belonged to at least two respective different groups at the preceding layer, into one next layer group.

\* \* \* \* \*